May 31, 1949.    A. H. JONES    2,471,961
SHOCKPROOF GAUGE MOUNTING
Filed May 19, 1944
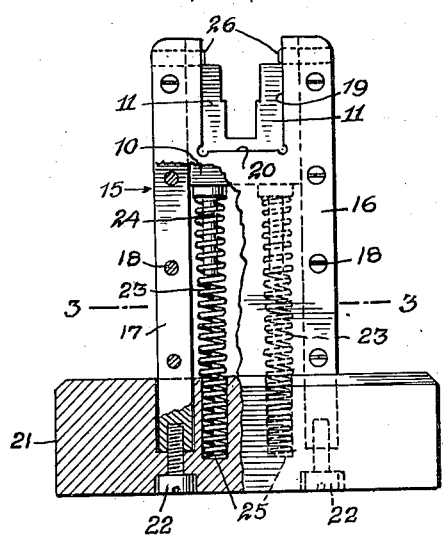
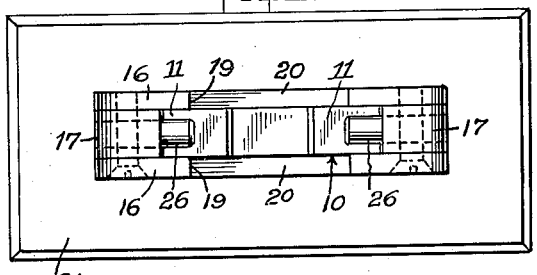
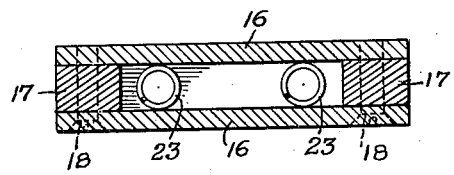
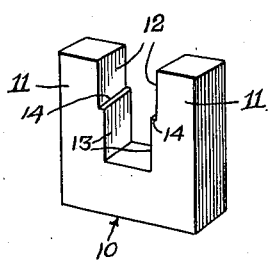
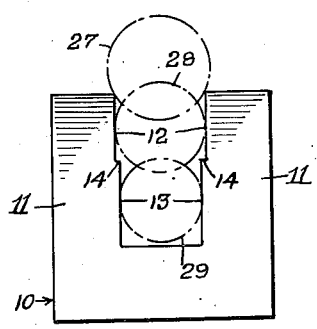
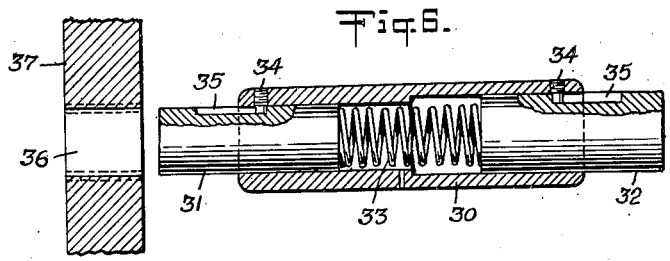
INVENTOR.
Allan H. Jones
BY
Munn, Liddy & Glaccum
Attorneys
Witnesses
Geo. W. Naylor
Chris Feinle.

Patented May 31, 1949

2,471,961

UNITED STATES PATENT OFFICE 2,471,961

SHOCKPROOF GAUGE MOUNTING

Allan H. Jones, Newark, N. J.

Application May 19, 1944, Serial No. 536,305

2 Claims. (Cl. 33—168)

1

This invention relates to devices for gaging the dimensions of work, and has especial reference to devices with which the sizes or dimensions of the work are determined by the Go and No Go method.

The principal object of the invention is the provision of a device of the indicated character which eliminates injury to the gaging means in testing work for size or diameter, so as to insure accuracy regarding dimensions, and also to prolong the life and usefulness of the device.

With the foregoing, other objects of the invention will appear when the following specification is read in connection with the accompanying drawing, in which—

Fig. 1 is a side view, partly in section of a device embodying the features of the invention.

Fig. 2 is a top plan view.

Fig. 3 is an enlarged sectional view taken on the line 3—3 of Fig. 1.

Fig. 4 is a perspective view of the gage element per se.

Fig. 5 is a side view of the gage element illustrating the manner in which the outside diameter of work is tested or measured.

Fig. 6 is a longitudinal sectional view of a modified form of device embodying the features of the invention for testing work as to inside diameter, such work also being shown in section.

The device includes a gage element 10 which is designed and adapted to gage the outside diameter of work through and by virtue of a Go size and a No Go size method. The gage element 10 consists of a metal body of U shape, or, in other words, the body is bifurcated and the furcations constitute jaws 11 spaced apart directly opposite each other. The jaws 11 present pairs of opposing faces 12—12 and 13—13, respectively. The faces 12—12 are parallel to each other as are the faces 13—13, and the latter are below the former. The faces 12—12 are spaced a predetermined distance and this distance is greater than the predetermined distance between the faces 13—13. The difference may be any amount according to the tolerances specified, such as a .001 of an inch. This provides shoulders 14—14 which are greatly exaggerated in the drawings for the sake of clearness. The gaging faces 12—12 determine the Go dimension which is the first or larger diameter, whereas the gaging faces 13—13 determine the No Go dimension which is the second or smaller diameter. In the gaging operation the work should enter the Go smoothly and freely without force. If the work enters the No Go in this manner the work is rejected as being unsatisfactory or not of the specified outside diameter.

Heretofore, a snap gage of the type described may be subjected to excessive force by careless users with the result the gage is damaged to the extent that it loses its accuracy.

In accordance with the present invention, the gage element 10 is supported or mounted in such manner it will yield when subjected to detrimental and injurious force in using the device, thereby prolonging the life and usefulness of the same. A holder 15 is provided, consisting of similar side plates 16 and spacing bars 17. The plates 16 are secured to the bars 17 on opposite sides, respectively, by screws 18, and the bars themselves are in spaced relation to each other to form a guide in which the gage element 10 may slide up and down. Each plate 16 has a rectangular notch 19 in the upper end to provide clearance for the work and an abutment 20 to stop the downward movement of the work while being gaged. The bars 17 are longer than the plates 16 so that the lower ends of the bars may extend into holes in a base block 21 with the lower edges of the plates 16 in contact with the upper surface of said block. Screws 22 are driven into tapped holes in the lower ends of the bars 17, respectively, the block also being drilled for this purpose. The gage element 10 is under the influence of one or more compression springs, there being two such springs 23 in the present instance. Each spring carries a headed rod 24 at its upper end to keep the spring from bending laterally. The lower end of each spring is received in a socket 25 in the block 21. The head end of each of the rods 24 bears against the underside of the gage element 10. The springs 23, therefore, constantly urge the gage element upwardly. The upward movement of the gage element is limited by stops 26 in the form of pins on the spacer bars 17, respectively. In the normal up position of the gage element the open end thereof is uppermost and the jaws 11 are exposed at the notches 19.

From the foregoing, it will be apparent that in gaging a piece of work to determine its outside diameter, should said piece be oversize as indicated at 27 in Fig. 5, the piece will bear on the upper ends of the jaws 11. If excessive and injurious pressure is applied, the gage element 10 will move downwardly to relieve the gage element. Also, if a piece of work, as indicated at 28 in Fig. 5, enters the Go and is kept from entering the No Go by the shoulders 14, the gage element will move downwardly under any excessive pressure. In this case, however, the piece 28 is of the specified diameter, yet the user may be subjecting the gage element to a damaging force. As the gage element 10 moves downwardly in each operation, the work piece will encounter the abutments 20, thereby preventing any abuse of the gage element which has yielded and so been relieved. Again, if a work piece, as indicated at 29, enters the No Go it will encounter the abutments 20 which may be coincidental with the bottom of the No Go or slightly below the same. A work piece entering the No Go is rejected as being less than the required diameter as will be understood. The springs 23 return the gage element to its normal up position and are of such strength that they are compressed if the work does not enter the gage element without force even though there is a snug feel in the case of close tolerances.

In Fig. 6 there is shown a modified device having the features of the invention for gaging inside diameters. This device includes vented tubular holder 30, a Go gage member 31 and a No Go gage member 32. The members 31 and 32 are cylindrical, and the member 31 is smaller in diameter than the diameter of the member 32. A compression spring 33 is arranged within the holder 30 with its opposite ends in contact with the inner ends, respectively, of the members. Each gage member normally projects beyond the holder and the outward movement to the projected position is limited by a stop pin 34 on the holder 30, the pin projecting into a longitudinal groove 35 in the gage member. It is obvious that should the No Go member 32 be larger in diameter than the hole 36 in the work 37 the member 32, under pressure of the user grasping the holder 30 and pushing the member 32 against the work, the member 32 will move into the holder 30. Also, if the Go member 31 should be larger than the hole 36, the member 31 will yield. If the Go member 31 enters the hole 36 freely or even with a snug feel the hole is of the specified diameter.

From the foregoing, it will be apparent the device is one by which the objects of the invention may be attained.

I claim:

1. A work gage comprising a frame, a gaging member slidable outwardly and inwardly with respect to the frame, said gaging member being bifurcated and having two pairs of opposed parallel work contact faces consisting of an outer pair and an inner pair, the distance between the outer pair of contact faces being greater than the distance between the inner pair of contact faces, corresponding faces being joined to provide shoulders intervening said pairs, resilient means constantly urging the gaging member outwardly and allowing it to slide inwardly, means limiting the outward sliding movement of the gaging member into a gaging position in which to receive work for a gaging operation, and an abutment on the frame which will be engaged by the work as the gaging member yields under pressure of the work while it is being gaged, thereby preventing the work from damaging the gaging member.

2. A work gage as set forth in claim 1, wherein both pairs of said work contact faces are disposed outwardly beyond said abutment when the gaging member is in the gaging position.

ALLAN H. JONES.

REFERENCES CITED

The following references are of record in the file of this patent:

UNITED STATES PATENTS

| Number | Name | Date |
|---|---|---|
| 793,620 | Bailley | June 27, 1905 |
| 999,141 | Anderson | July 25, 1911 |
| 2,021,201 | Roos | Nov. 19, 1935 |

FOREIGN PATENTS

| Number | Country | Date |
|---|---|---|
| 115,057 | Australia | May 7, 1942 |
| 552,340 | France | Apr. 28, 1923 |